United States Patent
Oates et al.

(10) Patent No.: US 7,788,867 B2
(45) Date of Patent: Sep. 7, 2010

(54) FLOOR TILE DEBRIS INTERCEPTOR AND TRANSITION PLENUM IN A NUCLEAR POWER PLANT

(75) Inventors: James Hibbert Oates, Gilroy, CA (US); Alan Wayne Fanning, San Jose, CA (US); Brian Douglas Frew, Fremond, CA (US); Bruce Peter Matthew Kobel, Selden, NY (US); Imad Ahmad Baghdadi, Ellington, CT (US)

(73) Assignee: General Electric Company, Schenectady, NY (US)

( * ) Notice: Subject to any disclaimer, the term of this patent is extended or adjusted under 35 U.S.C. 154(b) by 1366 days.

(21) Appl. No.: 10/962,558

(22) Filed: Oct. 13, 2004

(65) Prior Publication Data

US 2006/0075697 A1    Apr. 13, 2006

(51) Int. Cl.
*E04B 1/70* (2006.01)
*E04H 7/22* (2006.01)
*B01D 33/00* (2006.01)
*B01D 24/12* (2006.01)
*B01D 29/07* (2006.01)
*E03F 5/06* (2006.01)

(52) U.S. Cl. .................... 52/302.1; 52/302.2; 52/302.4; 210/162; 210/163; 210/293; 210/498

(58) Field of Classification Search ............... 52/302.1, 52/220.5, 302.2, 302.4; 210/162, 163, 164, 210/474, 498, 293
See application file for complete search history.

(56) References Cited

U.S. PATENT DOCUMENTS

| | | | | |
|---|---|---|---|---|
| 2,378,239 A | * | 6/1945 | Myron | 210/293 |
| 3,615,019 A | * | 10/1971 | Early, Jr. | 210/293 |
| 3,666,104 A | * | 5/1972 | Aprill et al. | 210/164 |
| 3,762,559 A | * | 10/1973 | Knoy et al. | 210/293 |
| 3,815,748 A | * | 6/1974 | Johannessen | 210/163 |
| 4,243,485 A | | 1/1981 | Chabin et al. | |

(Continued)

FOREIGN PATENT DOCUMENTS

JP     07260977     10/1995

(Continued)

OTHER PUBLICATIONS

European Patent Office Action and Search Report dated Mar. 3, 2006 for corresponding European Patent Application No. 05256240.2-2208.

*Primary Examiner*—Brian E Glessner
*Assistant Examiner*—Omar Hijaz
(74) *Attorney, Agent, or Firm*—Harness, Dickey & Pierce, P.L.C.

(57) ABSTRACT

A flooring system for intercepting debris including at least a plurality of floor tiles with a perforated top surface providing on a top of the plurality of tube frames for intercepting the debris. Each plurality of floor tiles may include a plurality of tube frames in side by side relationship to form a distributed suction area for fluid entrance into tile interiors and for debris interception and capture. The tile interiors of the flooring system may also provide a distributed flow path for fluid flow to a transition plenum. The flooring system may also include a transition plenum for directing a flow path of the fluid from the tiles to a sump, wherein the pumps take suction.

14 Claims, 6 Drawing Sheets

U.S. PATENT DOCUMENTS

| | | | |
|---|---|---|---|
| 4,563,270 A * | 1/1986 | Wolff | 209/379 |
| 4,619,765 A * | 10/1986 | Roberts | 210/289 |
| 4,762,610 A * | 8/1988 | Freissle | 209/397 |
| 5,030,343 A * | 7/1991 | Urriola | 210/170.03 |
| 5,032,294 A * | 7/1991 | Schulz | 210/795 |
| 5,069,781 A * | 12/1991 | Wilkes | 210/164 |
| 5,249,930 A * | 10/1993 | Pacquesi | 417/313 |
| 5,467,609 A * | 11/1995 | Feeney | 62/259.2 |
| 5,643,539 A * | 7/1997 | Collard et al. | 422/178 |
| 5,688,402 A | 11/1997 | Green et al. | |
| 5,865,999 A * | 2/1999 | Shea et al. | 210/289 |
| 6,065,609 A * | 5/2000 | Lake | 210/474 |
| 6,189,717 B1 * | 2/2001 | Versaw et al. | 220/62.19 |
| 6,241,882 B1 * | 6/2001 | Allard | 210/162 |
| 6,574,937 B1 * | 6/2003 | Rapisarda et al. | 52/630 |
| 2002/0148766 A1 | 10/2002 | Dwyer et al. | |
| 2007/0261452 A1 * | 11/2007 | Harbert | 71/11 |

FOREIGN PATENT DOCUMENTS

WO    WO/03097967    11/2003

\* cited by examiner

FLOOR TILE DEBRIS INTERCEPTOR AND TRANSITION PLENUM IN A NUCLEAR POWER PLANT

BACKGROUND OF INVENTION

1. Field of the Invention

This invention relates generally to a flooring system in a nuclear reactor, and more particularly, to a floor tile and transition plenum used in a nuclear power plant containment sump strainer system.

2. Description of Related Art

A reactor pressure vessel (RPV), such as in a boiling water reactor (BWR) or pressurized water reactor (PWR) nuclear power plant typically will disperse debris to the containment floor following a design basis Loss of Coolant Accident (LOCA) because such reactors have numerous insulated piping systems, and such piping systems are utilized to transport water throughout the reactor system. Nuclear plant design requires inclusion of plant systems for LOCA mitigation. A LOCA results when high pressure pipe ruptures with such force that large quantities of debris, such as pipe thermal insulation, coatings, concrete and other solids may be dispersed onto the containment floor along with reactor coolant and emergency system coolant pumped into the system to cool the reactor fuel (coolant injection) and containment equipment and structures (containment spray). As a result, the coolant being pumped into the reactor system and containment can cause the LOCA generated debris and other latent debris to be transported along with the coolant to the containment sumps where the emergency pumps take suction through containment sump strainers (or screens). The emergency pumps route the flow external to the containment through heat exchangers and re-introduce it to the reactor and containment spray systems in the post LOCA recirculation mode for long term cooldown of the reactor system. The fallen debris can accumulate on the containment sump strainers and affect the volumetric flow rate of cooling water delivered to the reactor and containment, which in turn, could lead to reactor core overheating.

A conventional approach to the above problem has been to install sump strainers at the containment sump to remove the debris while delivering appropriate amount of volumetric flow rate of water to the reactor following a LOCA. Sump strainers are generally used to remove debris or solids from the fluid present in the containment pool when the fluid is drawn into pump(s) in the Emergency Core Cooling System (ECCS) or the Containment Spray system. Sump strainers may prevent system degradation as the debris is collected at the sump strainers and prevent the debris from distributing throughout the reactor and containment spray systems while operating the post LOCA recirculation mode.

However, sump strainers tend to become clogged by large amounts debris due to small strainer size.

Further, sump strainers typically produce suction at a localized high entrance velocity. Localized high entrance velocities are established where the sump strainer is most proximate to the suction line of the pump, whereas low entrance velocities are established where the sump strainer is more distant from the suction line of the pump. The high entrance velocities may draw more solid debris into contact with the sump strainer causing the portions of the sump strainer experiencing the high entrance velocities to experience higher head loss. As the portion of the sump strainer most proximate to the suction line collects debris, high entrance velocities are established at the portion of the sump strainer that is next closest to the suction line causing that portion to collect debris. This process continues until the entire sump strainer has collected debris in varying quantities, resulting in a build-up of debris on the outer surface of the strainer. Localized high entrance velocities can be detrimental even when solids are not present in the liquid being pumped. For example, high entrance velocities can result in turbulent flow which tends to create greater pressure losses than laminar flow. Any such pressure losses reduce the net positive suction head available to a pump. As the net positive suction head available decreases, pump cavitation may occur. Similarly, localized high entrance velocities may cause vortexing. When a sump strainer is not sufficiently submerged, the vortexing can cause air ingestion which can severely degrade pump performance.

SUMMARY OF INVENTION

Accordingly, the present invention provides a method and apparatus to reduce the debris capturing burden on existing sump strainers or replacement sump strainers by serving as both multiple inlets for the sump strainer and a normal floor space as now exists in the power plant. Further, the method and apparatus may disperse the debris fallen into the containment area so as to reduce the quantity of debris being transported to the sump strainer-pump suction region.

In an exemplary embodiment, the flooring system for intercepting debris in a nuclear power plant may include a plurality of floor tiles for intercepting the debris, each plurality of floor tiles includes a plurality of tube frames in side by side relationship to form a suction area for fluid distribution and a perforated top surface provided on a top of the plurality of tube frames, and a transition plenum for directing a flow path of the fluid to a sump, by way of a the transition plenum being connected to the plurality of floor tiles on the upstream side and to the pump suction inlet at the containment sump on the downstream side.

In another exemplary embodiment, each plurality of tube frames may include sidewall windows so that fluid is drawn through the sidewall windows and distributed to the sump by any of a plurality of flow paths.

In yet other exemplary embodiment, the plurality of tube frames may be connected side by side to form a square.

In yet other exemplary embodiment, the plurality of tube frames may be 6×6 inches.

In yet other exemplary embodiment, each plurality of tube frames may be 5 inches in height.

In yet other exemplary embodiment, the plurality of tube frames may be connected to each other by at least one of welds, tongue and groove connectors, screws, adhesive, male and female connectors, and rivets.

In yet other exemplary embodiment, the plurality of tube frames may be made from steel.

In yet other exemplary embodiment, the plurality of tube frames may be connected to the perforated top surface by at least one of welds, tongue and groove connectors, screws, adhesive, male and female connectors, and rivets.

In yet other exemplary embodiment, the plurality of tube frames and the perforated top surface may be die cast molded.

In yet other exemplary embodiment, the perforation top surface may include approximately 40% open area of openings.

In yet other exemplary embodiment, the opening of perforations may have hole sizes ranging from approximately $3/32$ inch diameter to $1/4$ inch diameter.

In yet other exemplary embodiment, the perforated top surface may be a steel perforated plate.

In yet other exemplary embodiment, the steel perforated plate may have a thickness of approximately $1/16$ to $1/8$ inch.

In yet other exemplary embodiment, the plurality of floor tiles may be connected to each other by at least one of welds, tongue and groove connectors, screws, adhesive, male and female connectors, latches and rivets.

In yet other exemplary embodiment, the plurality of floor tiles may be connected to the plenum by at least one of welds, tongue and groove connectors, screws, adhesive, male and female connectors, latches and rivets.

In yet other exemplary embodiment, one side of the plenum may be connected to a sump strainer so as to direct a flow path of fluid from the pool to the sump in a parallel flow path to flow from the periphery of the floor tiles to the sump through the floor tiles.

In another exemplary embodiment, the plenum may include a plurality of windows for receiving the fluid from the floor tiles and directing into the sump, the windows are between a flange of a sump strainer and a flange of the sump.

In another exemplary embodiment, the plenum may include a plurality inspection port(s).

These and other features and advantages of this invention are described in, or are apparent from, the following detailed description of various exemplary embodiments of the apparatuses and methods according to the invention.

BRIEF DESCRIPTION OF THE DRAWINGS

The present invention will become more apparent by describing, in detail, exemplary embodiments thereof with reference to the attached drawings, wherein like elements are represented by like reference numerals, which are given by way of illustration only and thus do not limit the exemplary embodiments of the present invention.

DETAILED DESCRIPTION OF EXEMPLARY EMBODIMENTS

It should be noted that these Figures are intended to illustrate the general characteristics of methods and systems of exemplary embodiments of this invention, for the purpose of the description of such exemplary embodiments herein. These drawings are not, however, to scale and may not precisely reflect the characteristics of any given embodiment, and should not be interpreted as defining or limiting the range of values or properties of exemplary embodiments within the scope of this invention. For example, the relative dimensions and size of frame tubes and perforated tiles may be reduced or exaggerated for clarity. Like numerals are used for liked and corresponding parts of the various drawings.

A flooring system in accordance with the invention may be designed to serve as both multiple inlets for the sump strainer and a normal floor space as now exists in a power plant. Further, the flooring system may disperse collected debris fallen into the containment area so as to reduce debris from reaching (or being transported to) the sump strainer-pump suction region.

Figure 1A:
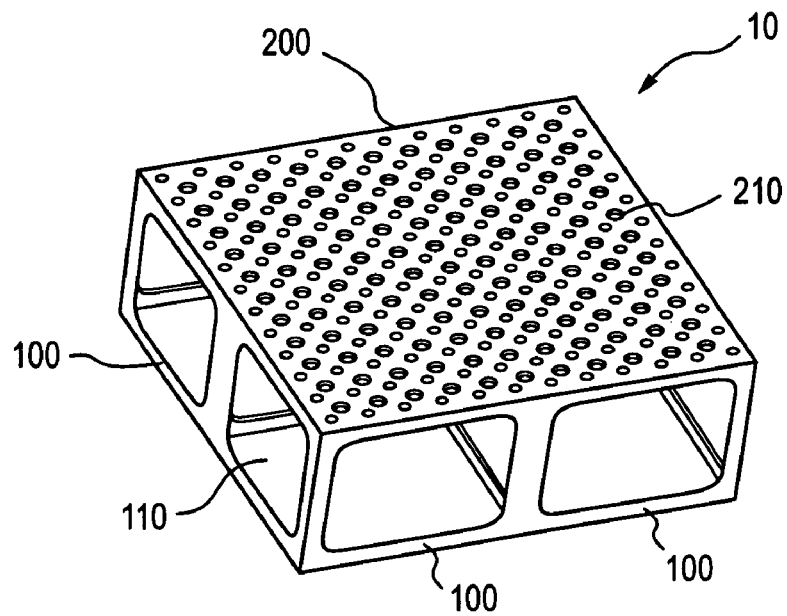
FIGS. 1A-1C are an isometric view, with exemplary dimensions of floor tiles in accordance with an exemplary embodiment of the invention.

FIG. 1A is an isometric view of a floor tile debris interceptor in accordance with an exemplary embodiment of the invention. The floor tile debris interceptor 10 may include a plurality of frame tubes 100 and a perforated top surface 200. Each plurality of frame tubes 100 includes a sidewall window 110 for fluid to be drawn through and distributed to its destination. The sidewall window 110 permits a hollow interior below the floor tile top surface 200 so that fluid may be dispersed to a sump pump 80 (shown in FIG. 2).

Figure 1B:
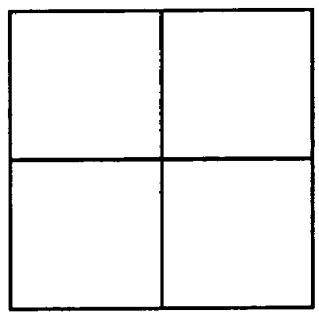
Figure 1C:
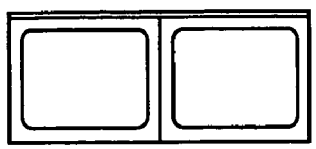

As shown in FIG. 1A, the frame tubes 100 are arranged in a side-by-side relationship to form a square flooring. As an exemplary embodiment, the floor tile 10 may include four (4) frame tubes 100 to form a square. However, it should be appreciated that more than four frame tubes may be used to form the floor tile, depending on the dimension of the frame tubes and the requirements of the specific application. The larger the surface area of the flooring system, the larger the sump suction area for fluid and debris to be dispersed. As shown in FIG. 1B, the dimension of each of the frame tubes 100 in the exemplary embodiment may be in the order of 6×6 inches, having a flooring system of 12×12 inches in total size. The design of a square system may provide the most stable floor support and the easiest installation, however, it should be understood that other shapes may be implemented, such as a rectangular flooring system. As shown in FIG. 1C, the frame tube 100 may have an exemplary embodiment of a height of 5 inches. However, it should be appreciated that other heights may be used depending on the application of the system.

The frame tube 100 may be designed to be connected to each other. As an exemplary embodiment, the frame tubes 100 are assembled through welds. The welds may be positioned as spot welds or along the entire edge of the frame tubes. However, it should be appreciated that other connections may be implemented besides weldment, for example, but not limited to, tongue and groove connectors, screws, adhesive, male and female connectors, latches, and rivets. It should also be appreciated that the frame tubes 100 may be die cast molded to form an unitary piece. Further, as a result of the frame tubes 100 being assembled to each other, ribs (not shown) may be formed between the connected frame tubes 100. The ribs may reduce the effective span of the tube frames and thereby increase the load carrying capability.

The frame tubes 100 may provide vertical and horizontal load paths to accommodate loads (force) normally present on industrial floor applications. In an alternative exemplary embodiment, for heavy load operations, the present invention may include latches (not shown) to connect the frame tubes 100 together. That is, latches may be employed rather than welds to disassemble the adjoining tiles. This permits easy and quick disassembly so as to pick up the tiles and stack them in a corner for convenience (e.g., after the heavy load operation has been completed, the tiles are set back in place and latched together). Further, it should be appreciated that the frame tubes 100 size and wall thickness may be selected to limit the permissible span for the perforated top surface 200.

Further, in the exemplary embodiment, the frame tube 100 may be composed of metal, such as steel. However, it should be understood that other compositions may be utilized to manufacture the frame tubes, for example, plastic. Accordingly, if plastic is used as the floor tile in the present invention, one of ordinary skill in the art would appreciate assembling the frame tubes 100 together by employing an plastic injection molding technique, for example.

The top surface 200 placed on top of the frame tubes 100 includes perforations 210 to provide multiple inlets to the sump pump and capture debris fallen on the containment floor. The perforations 210 may be in the size ranging from approximately 3/32 inch diameter to approximately 1/4 inch diameter depending on the application. The perforations 210 may provide openness of approximately 40% of the entire surface of the top surface 200. The perforations 210 may act as multiple inlets to the sump strainer by spreading out the sump suction area. In other words, multiple inlets permits the fluid flow to spread out over a large area to find its way to the sump and/or sump strainer to reduce the debris handling requirement placed on the sump strainer 90 (shown in FIG. 2). Further, the perforations 210 may act as a screen to capture the Loss of Coolant Accident (LOCA) generated debris fallen to the containment floor. As the LOCA water level rises above the top surface 200, the perforations 210 capture the debris as the water enters the tile interior while the sump strainer 90 has a reduced LOCA debris handling requirement, thereby simplifying sump strainer design and reducing equipment costs. This produces a reduction of debris present at the sump strainer 90 which reduces the impact on pump NPSH available.

As an exemplary embodiment, the top surface 200 may comprise of a steel perforated plate. However, it should be appreciated that other composition may be manufactured, such as, not limited to, plastic materials. The plate may be approximately 1/16 to 1/8 inch thick. The top surface 200 may be welded to the frame tubes 100. However, as stated similarly above, the attachment of the top surface 200 to the frame tubes 100 may be connected besides weldment, for example, but not limited to, tongue and groove connectors, screws, adhesive, male and female connectors, and rivets. It should also be appreciated that the top surface 200 and the frame tubes 100 may be die cast molded or injected molded to form an unitary piece.

The top surface 200 may include cruciform ribs (not shown) centered beneath the surface. The cruciform ribs intersect with the interior edges of the frame tubes 100 to provide structural support and stability. Further, the cruciform ribs may reduce the effective span required for each square frame tube and thus increase the load carrying capability.

In an alternative exemplary embodiment, the similar perforated plate (discussed above) may also be connected to the exterior sidewall of the frame tubes 100. The perforated plate on the sidewalls provide a completely surrounded enclosure and thus prevent debris from entering the interior volume of the frame tubes 100.

Figure 2:
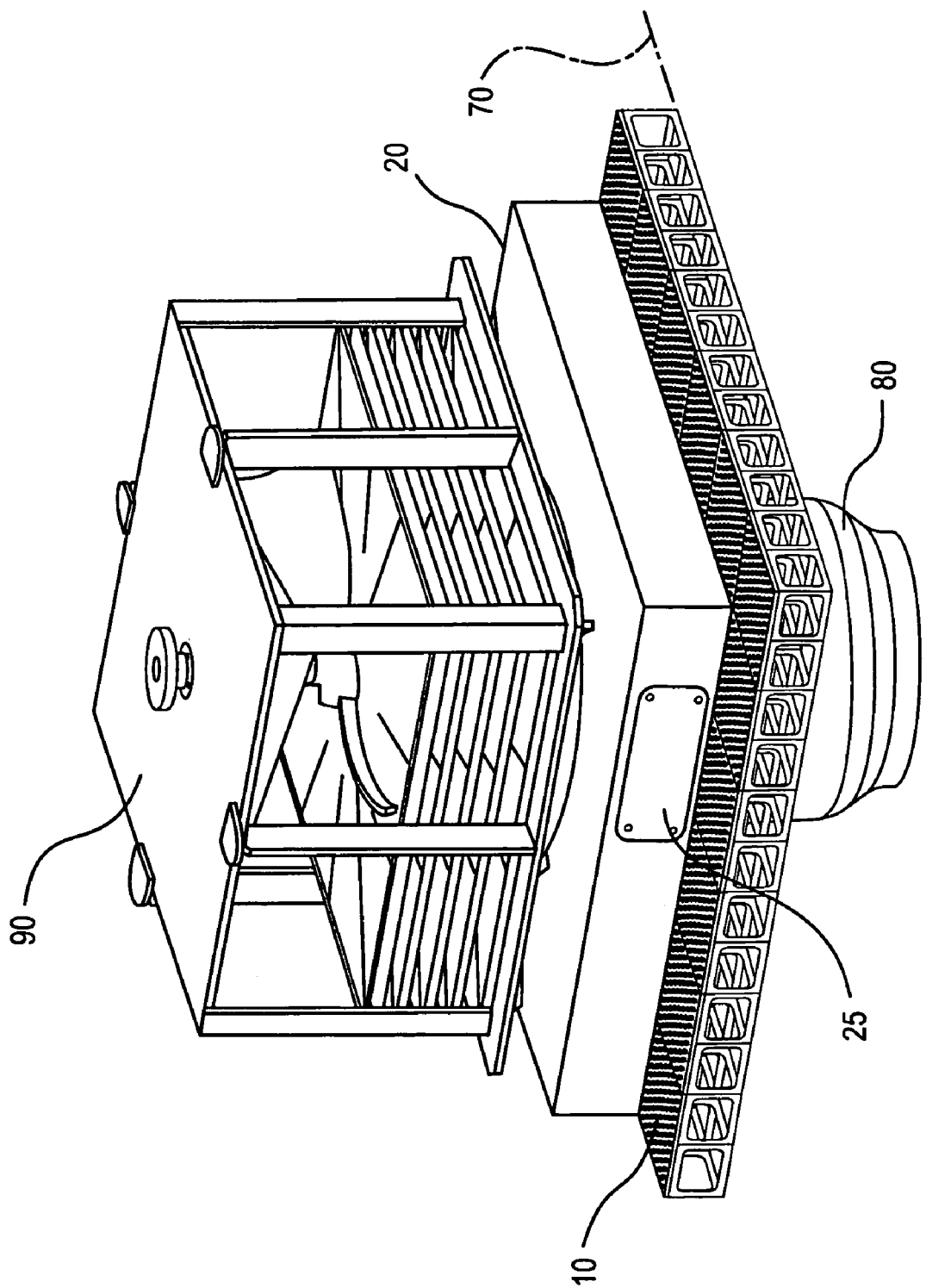
FIG. 2 is an isometric view of a flooring system connected to a sump strainer containment assembly in accordance with an exemplary embodiment of the invention.

FIG. 2 is an isometric view of a flooring system connected to a containment sump strainer assembly in accordance with an exemplary embodiment of the invention. The containment sump strainer assembly 90 typically is designed for use in PWR nuclear power plant applications to remove solids from the fluid present in the containment pool when the fluid is drawn into an existing in-concrete sump 80 or other recirculation system. Accordingly, the flooring system of the present invention may substantially strain the fluid free from particulate matter or debris so as to reduce downstream equipment degradation.

The flooring system may include at least a plurality of floor tiles 10 and a transition plenum 20. As shown in FIG. 2, the flooring system is installed on a sump 80 which is below the concrete flooring 70. The flooring system, particularly the plenum 20 may be installed on an existing sump flange via the mating plenum flange 85 (shown in FIG. 5). Accordingly, the floor tiles 10, via the plenum 20 may be connected to the sump flange by the mating plenum flange 85 and extend far away from the sump. The arrangement of the individual floor tiles 10 may be laid side-by-side on the containment floor covering the floor to whatever extent is required, up to and including wall-to-wall covering. It should be appreciated that the floor tiles 10 may be designed to be connected or latched to adjacent floor tiles. As an exemplary embodiment, self interlocking gap fillers (i.e., surface open area and perforation size equal to or less than the open area of the tile top perforate surface) may be utilized to connect the tiles together. The tiles may also be connected to the transition plenum 20, by also way of the aforementioned self-interlocking feature or latches present on the individual tiles. The transition plenum 20 may be designed to be connected to the floor tiles 10 to the sump 80 so as to provide a redundant (or partial redundant) flow path to the sump pumps, thereby reducing the debris capturing burden on existing or replaced sump strainers 90. The transition plenum 20 may be connected to the sump flange by the mating plenum flange 85 (shown in FIG. 5) that collects or routes the flow from the periphery of the tile arrangement (and from many tile locations between the sump and the tile periphery) to the sump 80. The plenum 20 may contain a plurality of inspection ports 25 to gain entry inside of the plenum 20 for inspecting and maintenance purposes.

It should be appreciated that more than one transition plenum 20 may be placed in a PWR containment depending on the design details of the existing containment sump.

Figure 3:
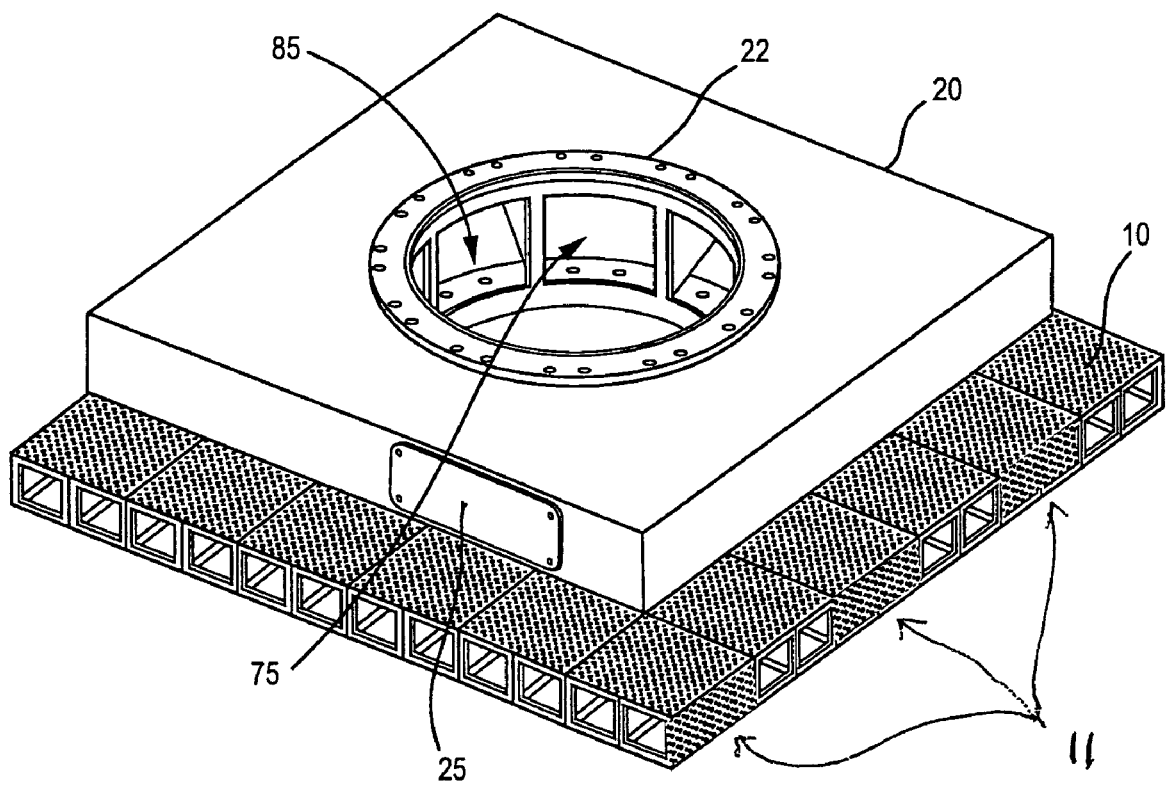
FIG. 3 is an isometric view of floor tiles and plenum in accordance with an exemplary embodiment of the invention.

FIG. 3 is an isometric view of a floor tile debris interceptor and plenum in accordance with an exemplary embodiment of the invention. As shown in FIG. 3, the sump strainer 90 is removed in this illustration for clarification purposes. Mounted on the plenum 20 is a sump strainer mounting flange 22. In the exemplary embodiment, the mounting flange 22 may be in a circular arrangement. However, it should be understood that the mounting flange 22 may be in other shapes depending on the sump strainer. Further, in an exemplary embodiment, the plenum 20 may be mounted to the sump strainer mounting flange 22 via bolts or studs and corresponding nuts.

Further, the plenum 20 may be connected over an existing in-concrete sump 80 by mounting over an existing sump flange by the mating plenum flange 85. In the exemplary embodiment, the sump flange mating plenum flange 85 may be in a circular arrangement to coincide with the circular arrangement of the sump mounting flange, not shown. Further, in an exemplary embodiment, the mating plenum flange 85 may be connected to the plenum 20 via bolts or studs and corresponding nuts.

Between the strainer mounting flange 22 and the sump flange mating plenum flange 85 may be plenum windows 75 for receiving the fluid from the floor tiles 10 and distributing the fluid into the sump 80. In an exemplary embodiment, the plenum 20 may have eight (8) plenum windows for receiving the fluid in all of the floor tiles 10. However, it should be appreciated that other amounts of windows may be designed depending on the volumetric flow rate of the fluid and the details of the specific plant application. Additionally, sidewall windows 110 may include a perforated plate 11 for peripheral floor tiles 10.

Figure 4:
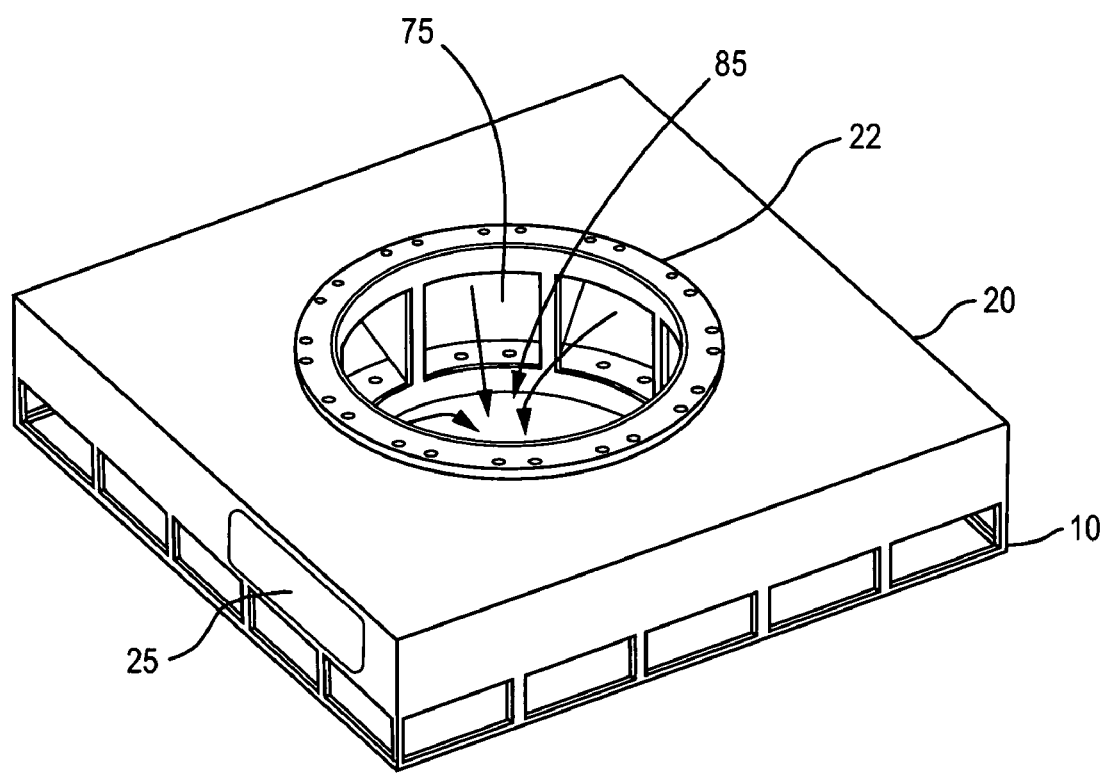
FIG. 4 is an isometric view of a flooring system plenum without tiles in accordance with an exemplary embodiment of the invention.

FIG. 4 is an isometric view of a portion of an exemplary embodiment of a flooring system without the floor tiles 10 and plenum 20 in order to describe the flow path of fluid. In the event of a LOCA, large volume of fluid including debris will accumulate into a containment pool above the flooring system of the present invention. Water containing LOCA debris may flow through the perforated top surface of the floor tiles 10 and into the tile interior volume. As the fluid is sucked into the sump by the operating sump pump(s), solid debris may be deposited on the perforated plate top surface 200 of the tiles 10. Thence, flow may be from tile to tile via any tile interior flow path until the fluid reaches the sump 80 and into the normal ECCS path by way of plenum 20. Accordingly, the distributed pump suction flow path through the tiles 10 may draw fluid flow from a large distance from the sump 80 due to the plurality of perforations 210 in the tiles 10 and deposit suspended debris on the tile top surface 200 as the flow enters the tiles 10 interior. Accordingly, the perforations 210 may act as multiple inlets to capture debris distant from the sump 80. As the fluid may become restricted at one location on the tiles 10 as a result of debris capture, the flow path may divert to a new open path, and the sequence may be repeated until the flow on some floor tiles 10 may be effectively reduced to zero (or to an insignificant level) due to the accumulation of debris on the tile top perforated surface 200. During this occurrence, the debris, that follows the flow, may be distributed over the floor tiles 10 and away from the sump 80 and sump strainer 90 (if fitted). This results in a reduction in the debris load that can reach the sump strainer, thereby reducing the debris handling requirements placed on the sump strainers.

Figure 5:
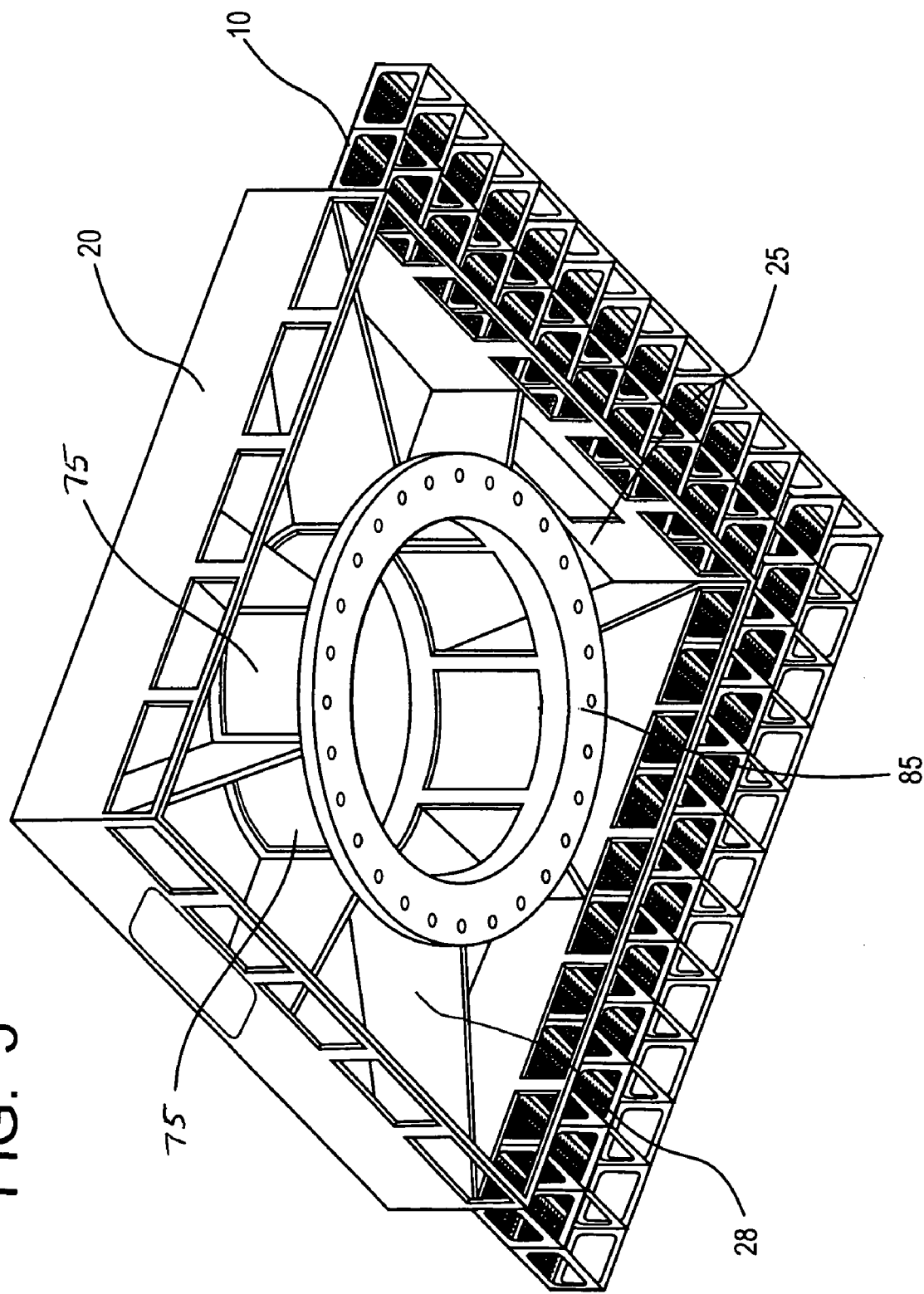
FIG. 5 is an isometric view of an underside of the flooring system and plenum in accordance with an exemplary embodiment of the invention.

FIG. 5 is an isometric view of an underside of the flooring system and plenum in accordance with an exemplary embodiment of the invention. As shown in FIG. 5, the plenum 20 is connected to a sump flange by the mating plenum flange 85. The plenum 20 is also provided with windows 75 for receiving and routing the fluid into the sump (not shown). Further, in this exemplary embodiment, the plenum 20 is shown with two inspection ports 25. However, it should be appreciated that more than two inspection ports may be provided. Also shown are supporting ribs 28 in the plenum 20 extending outward from windows 75. The supporting ribs 28 are provided for structural support.

In an alternative embodiment, the flooring system may include a height adjustment device (not shown) to adjust the height of tube frames in order to accommodate slight variances in the containment floor. This height adjustment capability may be facilitated by, for example, a threaded rounded stud piece (not shown) being received in a threaded bore formed in the base of the tube frames at each corner. However, it should be appreciated that other adjustment means may be implemented besides the one described above. For example, but not limited to, corner mounted wedging devices actuated through the tile top surface 200 and captured shims mounted to the threaded stud pieces discussed above.

Figure 6:
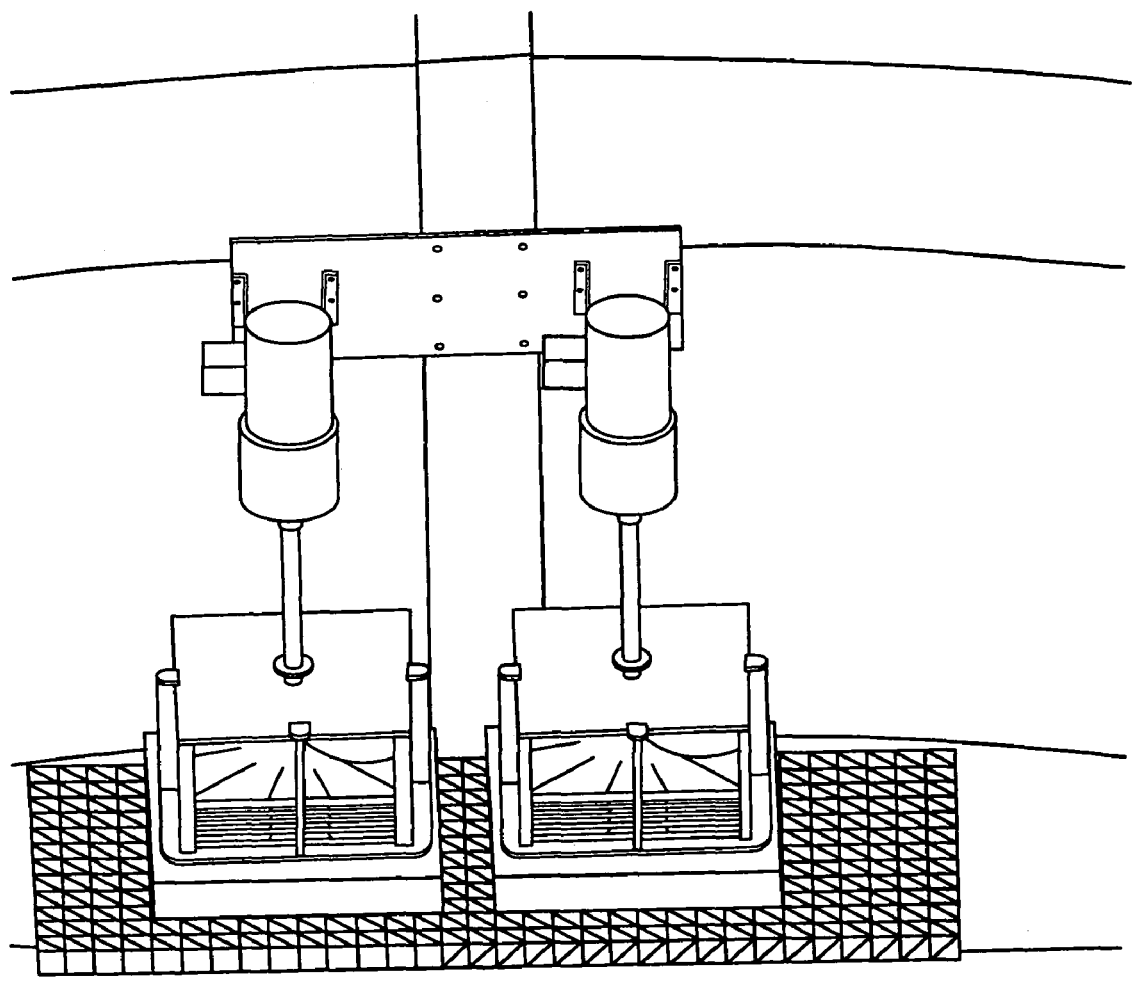
FIG. 6 is an isometric view of a flooring system installed in a PWR containment in accordance with an exemplary embodiment of the invention.

FIG. 6 is an isometric view of a debris tile flooring system installed in a PWR containment in accordance with an exemplary embodiment of the invention. As shown in FIG. 6, a design is depicted where there are two containment sumps that are placed on approximately 6-foot centers with transition plenums 20 shown on top of each containment sump (not shown). Each plenum is shown fitted with a motorized active sump strainer 90. Each active sump strainer is driven by a shaft from an electric motor mounted on a containment column at the periphery of the reactor containment, the wall shown in the background. Each plenum is fitted with an array of tiles 10 on the containment floor 70. For illustration purposes, there are two rows of tiles, six tiles deep on the left side plenum 20, one row between the 2 plenums, and 3 rows on the right side of the second plenum. There is one row of tiles shown in front of each plenum spanning a total width of 16 feet (16 tiles). A total of 46 tiles are shown. This illustrative arrangement increases the passive strainer area available for debris capture (interception) by 46 square feet. Larger tile areas may be used producing larger debris interception capture capability.

In the exemplary embodiments, the sump strainer design is simplified and the size of the sump strainer is reduced. Accordingly, the design, fabrication, and installation cost of the sump strainer will be reduced. Moreover, it should be appreciated that in some applications, the presence of the present invention may eliminate the need for sump strainers that are currently present or planned for installation.

Although the preferred embodiments have been described in the field of power generation, one of ordinary skilled in the art would appreciate that the present invention may be applicable where small reduction in headspace is permissible and where distributed suctions may be necessary or desirable to handle debris-laden fluids.

Further, it should be appreciated that "fluid" may encompass water, gases, air or other fluids, or mixtures thereof.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed:

1. A flooring system for intercepting debris in a nuclear power plant, comprising:
   a transition plenum disposed between a sump strainer of the nuclear power plant and an associated sump; and
   a plurality of floor tiles operatively connected to the transition plenum;
   wherein each floor tile includes:
   a plurality of frame tubes;
   a perforated top surface; and
   a substantially open bottom surface;
   wherein the plurality of frame tubes of each floor tile are connected side-by-side to form a suction area, associated with that floor tile, for fluid of the nuclear power plant,
   wherein each frame tube includes:
   a top member;
   a bottom member; and
   side members;
   wherein the top members, bottom members, and side members form sidewall windows associated with each floor tile,
   wherein the sidewall windows of each floor tile are configured to allow flow of the fluid, in and out of the suction area, in substantially any horizontal direction,
   wherein the sidewall windows of each floor tile are configured to allow the fluid to pass from the suction area of each floor tile, through one or more of the sidewall windows, to the transition plenum,
   wherein the perforated top surface of each floor tile is provided on a top of the plurality of frame tubes associated with that floor tile,
   wherein the perforated top surface of each floor tile is configured to allow the fluid to enter the suction area associated with that floor tile,
   wherein the perforated top surface of each floor tile is configured to intercept the debris attempting to enter the suction area associated with that floor tile,
   wherein the transition plenum is configured to direct the fluid from the sump strainer to the sump, and
   wherein the transition plenum is configured to direct the fluid from the suction area of each floor tile to the sump.

2. The flooring system of claim 1, wherein the transition plenum includes one or more plenum windows configured to allow the fluid to pass through the one or more plenum windows in order to reach the sump.

3. The flooring system of claim 1, wherein the sidewall windows include a perforated plate for peripheral floor tiles.

4. The flooring system of claim 1, wherein the plurality of floor tiles are latched to each other.

5. The flooring system of claim 1, wherein the plurality of floor tiles are latched to the transition plenum.

6. The flooring system of claim 1, wherein the transition plenum includes an inspection port or ports.

7. The flooring system of claim 1, wherein the plurality of frame tubes are welded to each other.

8. The flooring system of claim 1, wherein the plurality of frame tubes are made from steel.

9. The flooring system of claim 1, wherein the plurality of frame tubes are welded to the perforated top surface.

10. The flooring system of claim 1, wherein the perforated top surface includes approximately 40% open area of openings.

11. The flooring system of claim 10, wherein the openings of the perforated top surface have hole sizes ranging from approximately 3/32 inch diameter to approximately 1/4 inch diameter.

12. The flooring system of claim 1, wherein the perforated top surface is a perforated steel plate.

13. A flooring system for a nuclear power plant, comprising:
    a transition plenum disposed between a sump strainer of the nuclear power plant and an associated sump; and
    floor tiles associated with the transition plenum;
    wherein each floor tile includes:
    frame tubes;
    a perforated top surface; and
    a substantially open bottom surface;
    wherein the frame tubes are connected side-by-side to form a suction area for fluid of the nuclear power plant,
    wherein each frame tube includes:
    a top member;
    a bottom member; and
    side members;
    wherein the top members, bottom members, and side members form sidewall windows,
    wherein the sidewall windows of each floor tile are configured to allow flow of the fluid, in and out of the suction area,
    wherein the sidewall windows are configured to allow the fluid to pass from the suction area, through at least one of the sidewall windows, to the transition plenum,
    wherein the perforated top surface is provided on a top of the frame tubes,
    wherein the perforated top surface is configured to allow the fluid to enter the suction area,
    wherein the perforated top surface is configured to intercept debris in the nuclear power plant attempting to enter the suction area,
    wherein the transition plenum is configured to direct the fluid from the sump strainer to the sump, and
    wherein the transition plenum is configured to direct the fluid from the suction area to the sump.

14. A flooring system for intercepting debris in a nuclear power plant, comprising:
    a transition plenum disposed between a sump strainer of the nuclear power plant and an associated sump; and
    a plurality of floor tiles operatively connected to the transition plenum;
    wherein each floor tile includes:
    a plurality of frame tubes;
    a perforated top surface; and
    a substantially open bottom surface;
    wherein the plurality of frame tubes of each floor tile are connected side-by-side to form a suction area, associated with that floor tile, for fluid of the nuclear power plant,
    wherein each frame tube includes:
    a top member;
    a bottom member; and
    side members;
    wherein the top members, bottom members, and side members form sidewall windows associated with each floor tile,
    wherein the sidewall windows of each floor tile are configured to allow flow of the fluid, in and out of the suction area, in substantially any horizontal direction,
    wherein the sidewall windows of each floor tile are configured to allow the fluid to pass from the suction area of each floor tile, through one or more of the sidewall windows, to the transition plenum,
    wherein the perforated top surface of each floor tile is provided on a top of the plurality of frame tubes associated with that floor tile,
    wherein the perforated top surface of each floor tile is configured to allow the fluid to enter the suction area associated with that floor tile,
    wherein the perforated top surface of each floor tile is configured to intercept the debris attempting to enter the suction area associated with that floor tile,
    wherein the transition plenum is configured to direct the fluid from the sump strainer to the sump, and
    wherein the transition plenum is configured to direct the fluid from the suction area of each floor tile to the sump.

* * * * *